US006330144B1

(12) United States Patent
Lee et al.

(10) Patent No.: US 6,330,144 B1
(45) Date of Patent: Dec. 11, 2001

(54) MULTI-VOLTAGE MULTI-POLE SAFETY ELECTRIC ADAPTER

(76) Inventors: Chiu-Shan Lee; Shen Su-Chen Li, both of No. 31, Lane 18, Chang-Chun Rd., Hsintien City, Taipei County (TW)

( * ) Notice: Subject to any disclaimer, the term of this patent is extended or adjusted under 35 U.S.C. 154(b) by 0 days.

(21) Appl. No.: 09/542,916

(22) Filed: Apr. 4, 2000

(51) Int. Cl.[7] .............................. H02B 1/26; H01H 73/00

(52) U.S. Cl. .......................... 361/115; 361/623; 439/651; 439/652

(58) Field of Search ............................... 361/54, 118, 56, 361/115, 600, 633, 623, 622, 634, 637; 439/296, 290, 333, 43, 49, 52, 652, 660, 659; 363/100, 142, 143, 146; 307/147, 11, 21, 18

(56) References Cited

U.S. PATENT DOCUMENTS 5,164,609 * 11/1992 Poppe et al. ......................... 307/147
5,272,587 * 12/1993 Wan ..................................... 361/111
6,111,772 * 8/2000 Lee et al. ............................. 363/146
6,113,434 * 9/2000 Pate ..................................... 439/652

* cited by examiner

*Primary Examiner*—Kim Huynh
(74) *Attorney, Agent, or Firm*—Rosenberg, Klein & Lee

(57) ABSTRACT

A multi-voltage multi-pole safety electric adapter is constructed to include a socket unit, the socket unit having a first set of plug holes for receiving a low voltage plug and a second set of plug holes for receiving a high voltage plug, and a first set of metal contacts and a second set of metal contacts respectively disposed at a back side wall thereof, a low voltage plug unit and a high voltage plug unit alternatively fastened to the back side wall of the socket unit for receiving a low voltage power supply from or high voltage power supply from an electric outlet, the low voltage plug unit having a set of metal contacts corresponding to the first set of metal contacts at the socket unit, the high voltage plug unit comprising a set of metal contacts corresponding to the second set of metal contacts at the socket unit, and a transformer installed in the socket unit for converting low voltage input power supply or high voltage input power supply into the desired power level.

10 Claims, 12 Drawing Sheets

MULTI-VOLTAGE MULTI-POLE SAFETY ELECTRIC ADAPTER

BACKGROUND OF THE INVENTION

The present invention relates to a multi-voltage multi-pole electric adapter, and more particularly to such an electric adapter, which comprises a plug unit for receiving low voltage (AC125V) power input or high voltage (AC250V) power input, a socket unit for power output, and a transformer for converting inputted power supply from the plug unit into the desired level for the socket unit.

Following fast development of high technology, a variety of advanced electronic apparatus have been disclosed for different purposes. However, because different countries have different electric codes, different electric sockets and electric plugs are used in different countries. For connecting an electric plug to an electric socket of a different specification, an adapter shall be used. However, regular adapters for this purpose are constructed to fit one particular voltage power supply only.

SUMMARY OF THE INVENTION

The present invention has been accomplished under the circumstances in view. It is one object of the present invention to provide a multi-voltage multi-pole safety electric adapter, which is adapted to connect any of a variety of electric sockets to any of a variety of electric plugs. It is another object of the present invention to provide a multi-voltage multi-pole safety electric adapter, which fits different voltage levels. According to one aspect of the present invention, the multi-voltage multi-pole safety electric adapter comprises a socket unit, the socket unit comprising a face panel, the face panel comprising a first set of plug holes for receiving a low voltage plug and a second set of plug holes for receiving a high voltage plug, a low voltage metal bracket and a high voltage metal bracket respectively mounted on the inside corresponding to the first set of plug holes and the second set of plug holes, a first set of metal contacts and a second set of metal contacts respectively disposed at a back side wall thereof and connected to the low voltage metal bracket and the high voltage metal bracket for low voltage power input and high voltage power input respectively; a low voltage plug unit and a high voltage plug unit alternatively fastened to the back side wall of the socket unit for receiving a low voltage power supply from or high voltage power supply from an electric outlet, the low voltage plug unit comprising a set of metal contacts corresponding to the first set of metal contacts at said socket unit, the high voltage plug unit comprising a set of metal contacts corresponding to the second set of metal contacts at the socket unit; a transformer installed in the socket unit and connected between the first set of metal contacts and second set of metal contacts of the socket unit and the low voltage metal bracket and high voltage metal bracket of the socket unit for converting low voltage input power supply or high voltage input power supply into the desired power level; and a circuit breaker connected between the transformer and the low voltage metal bracket and high voltage metal bracket. According to another aspect of the present invention, low voltage indicator light means and high voltage indicator light means may be installed in the socket unit for the indication of the current voltage level in work. According to another aspect of the present invention, safety switch means may be installed in the socket unit to prevent an accident due to the insertion of a wrong plug into the plugholes on the face panel.

BRIEF DESCRIPTION OF THE DRAWINGS

FIG. 2-1 shows different alternate forms of the plug unit for the multi-voltage multi-pole safety electric adapter according to the present invention.

FIG. 10-1 is similar to FIG. 10 but showing a low voltage (AC 125V) plug is inserted into the plugholes on the face panel of the socket unit.

FIG. 10-2 is similar to FIG. 10 but showing a low voltage (AC 125V) plug is inserted into the plugholes on the face panel of the socket unit.

DETAILED DESCRIPTION OF THE PREFERRED EMBODIMENT

Figure 1:
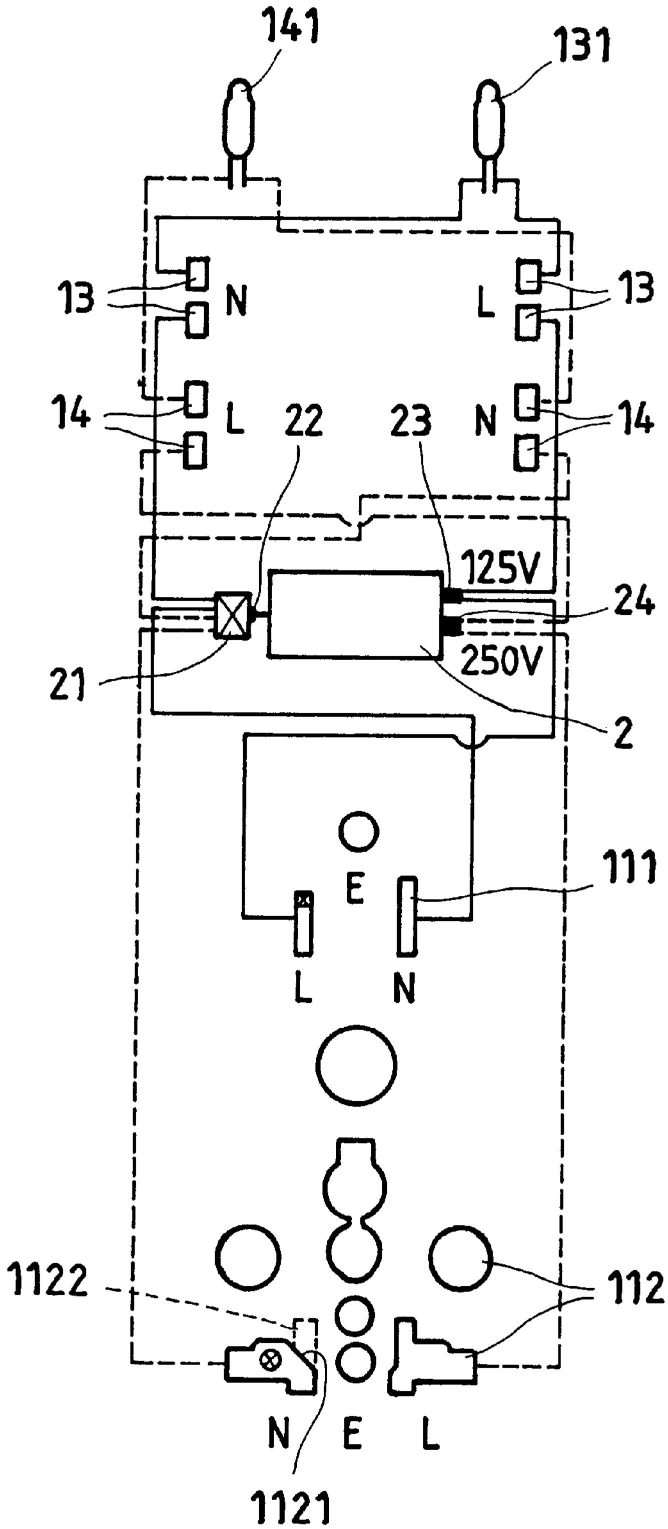
FIG. 1 shows a circuit layout for a multi-voltage multi-pole safety electric adapter according to the present invention.

Referring to FIGS. from 1 through 3, a multi-voltage multi-pole safety electric adapter in accordance with the present invention is generally comprised of a socket unit 1, a transformer 2 installed in the socket unit 17 and a plug unit 3 fastened to the socket unit 1.

Referring to FIGS. from 1 through 3 again, the socket unit 1 comprises a face panel 11 having a first set of plug holes 111 for receiving any of a variety of low voltage plug and a second set of plug holes 112 for receiving any of a variety of high voltage plug, a low voltage (AC 125V) metal bracket and a high voltage (AC250V) metal bracket respectively mounted on the inside corresponding to the first set of plug holes 111 and the second set of plug holes 112, a first set of metal contacts 13 and a second set of metal contacts 14 respectively disposed at the back side wall thereof for low voltage (AC 125V) power input and high voltage (AC250V) power input respectively, a pair of sliding tracks 12 bilaterally longitudinally disposed at the back side wall for the mounting of a plug unit 3, and a springy hook 121 formed integral with the back side wall. One plug hole of the second set of plug holes 112 comprises a bevel edge 1121, which prevents the insertion of a low voltage plug into the second set of plug holes 112. The dotted line 1122 shows an extension area at one of the second set of plug holes 112 adapted to fit the electric codes in certain countries where low voltage plugs and which voltage plugs have same configuration of metal blades. N pole of low voltage (AC125V) power input metal contacts and N pole of high voltage (AC250V) power input metal contact are respectively connected to the common contact 22 of the transformer 2. which is in turn connected to a circuit breaker 21. L pole of pole of low voltage (AC125V) power input metal contacts and 1, pole of high voltage (AC250V) power input metal contact are respectively connected to the low voltage (AC125V) power input terminal 23 and high voltage (AC250V) power input terminal 24 of the transformer 2.

Figure 2:
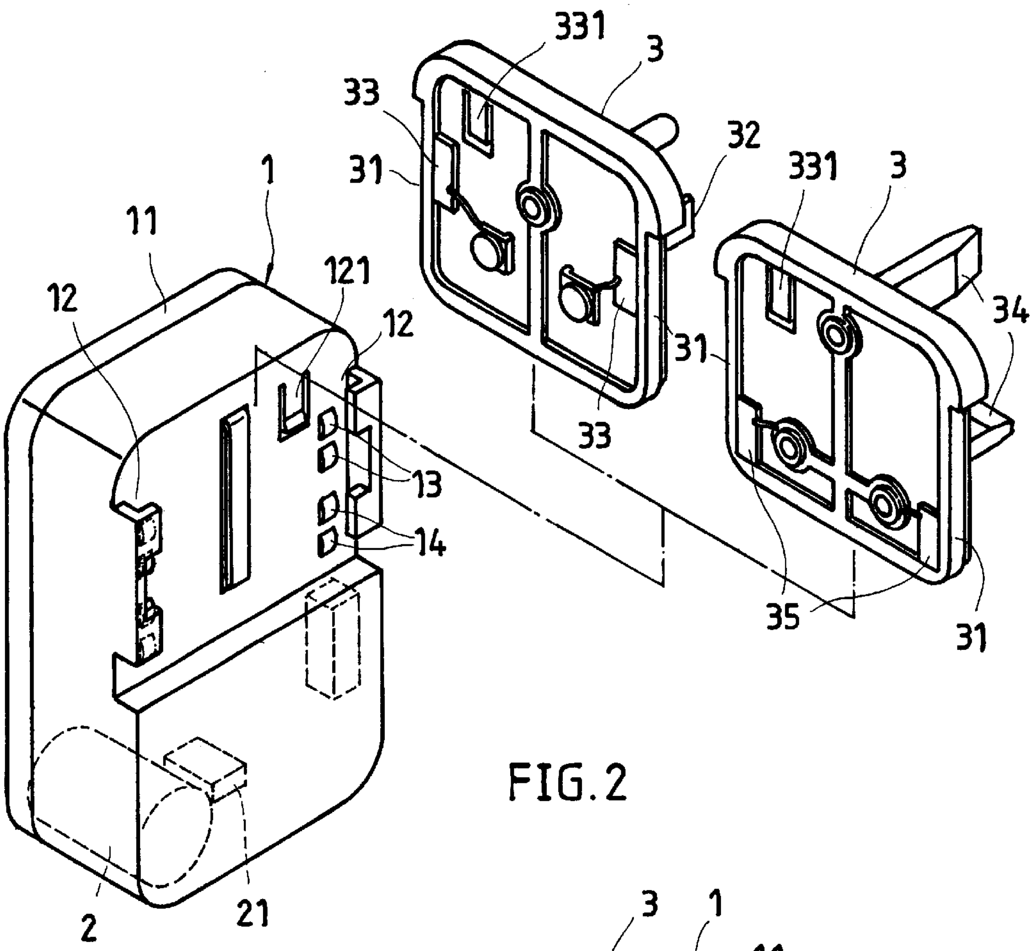
FIG. 2 illustrates two different plug units for alternative use with the socket unit according to the present invention.
Figure 3:
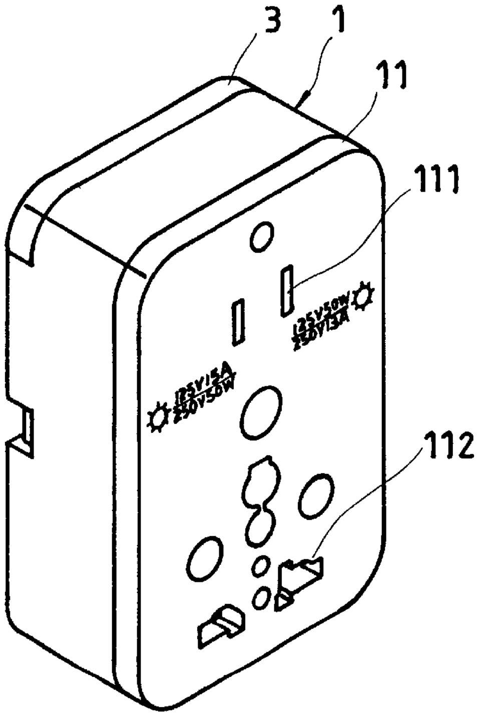
FIG. 3 is an elevational view showing one plug unit installed in the socket unit according to the present invention.
Figure 10:
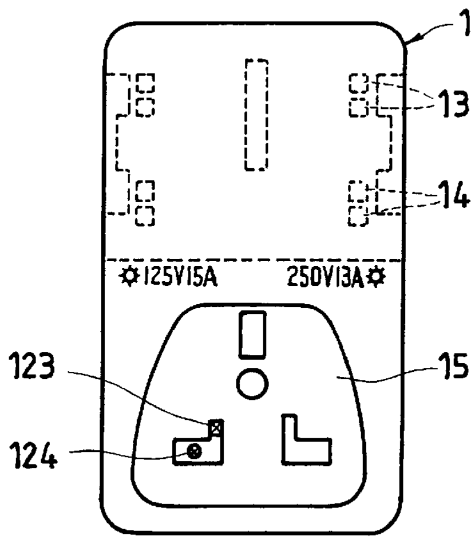
FIG. 10 is plain view of the present invention showing a safety switch means provided in the socket unit.
Figures 1, 2:
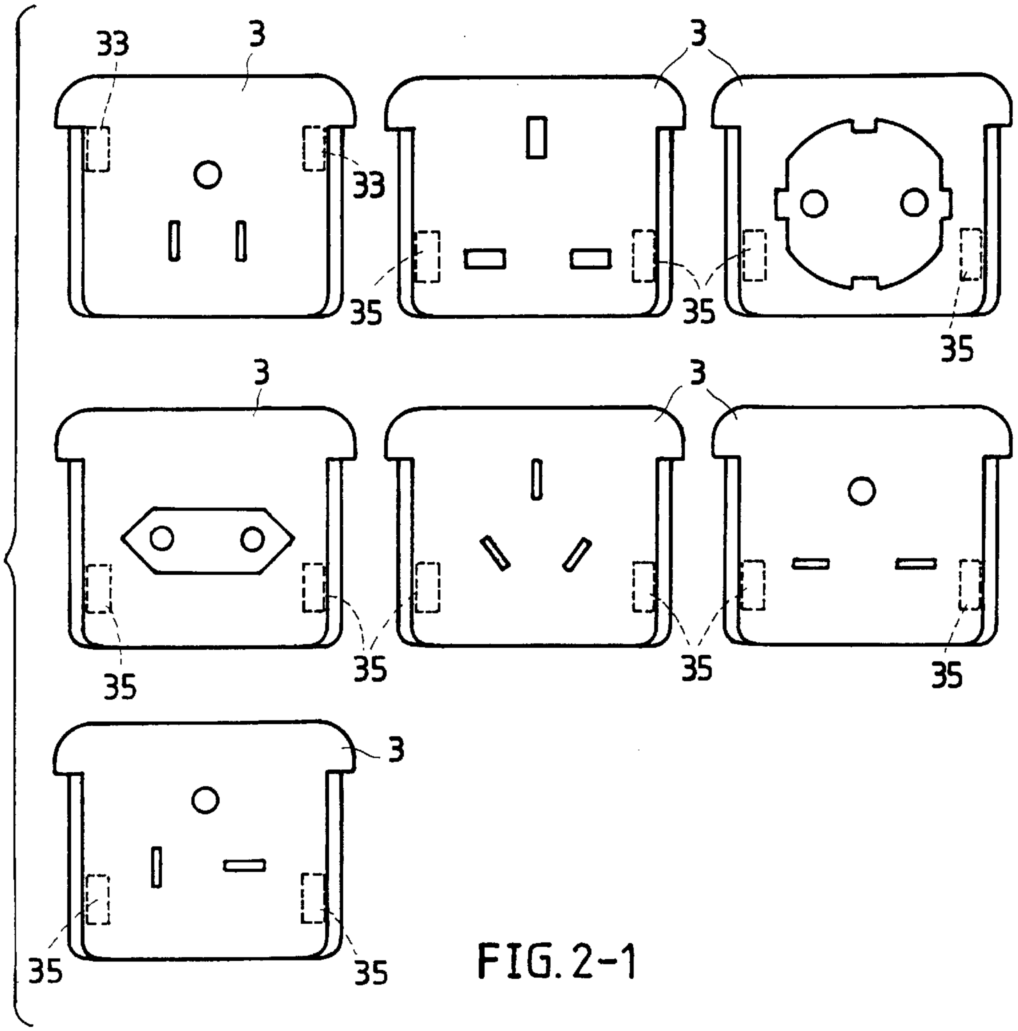

FIG. 2 shows two different alternate forms of the plug unit 3, one for low voltage (AC125V) power input and the other for high voltage (AC250V) power input. The plug unit 3 comprises a set of metal plug rod members 32 or 34 for receiving low voltage (AC125V) power supply or high voltage (AC250V) from an electric outlet (not shown), two sliding rails 31 respectively formed integral with two opposite lateral sides walls thereof for insertion into the sliding tracks 12 at the socket unit 1, a set of metal contacts 33 or 35, which are forced into contact with the first set of metal contacts 13 or second set of metal contacts 14, after the insertion of the sliding rails 31 of the plug unit 3 into the sliding tracks 12 at the socket unit 1, for enabling input low voltage (AC125V) power supply or high voltage (AC250V) to be transmitted to the transformer 2, which in turns converts input low voltage (AC125V) power supply into AC125V 15A for the low voltage metal bracket in the socket unit 1 or high voltage (AC250V) into AC250V50W for the high voltage metal bracket in the socket unit 1, and a springy retaining strip 331 for engagement with the springy hook 121 to secure the plug unit 3 to the socket unit 1.

Figure 5:
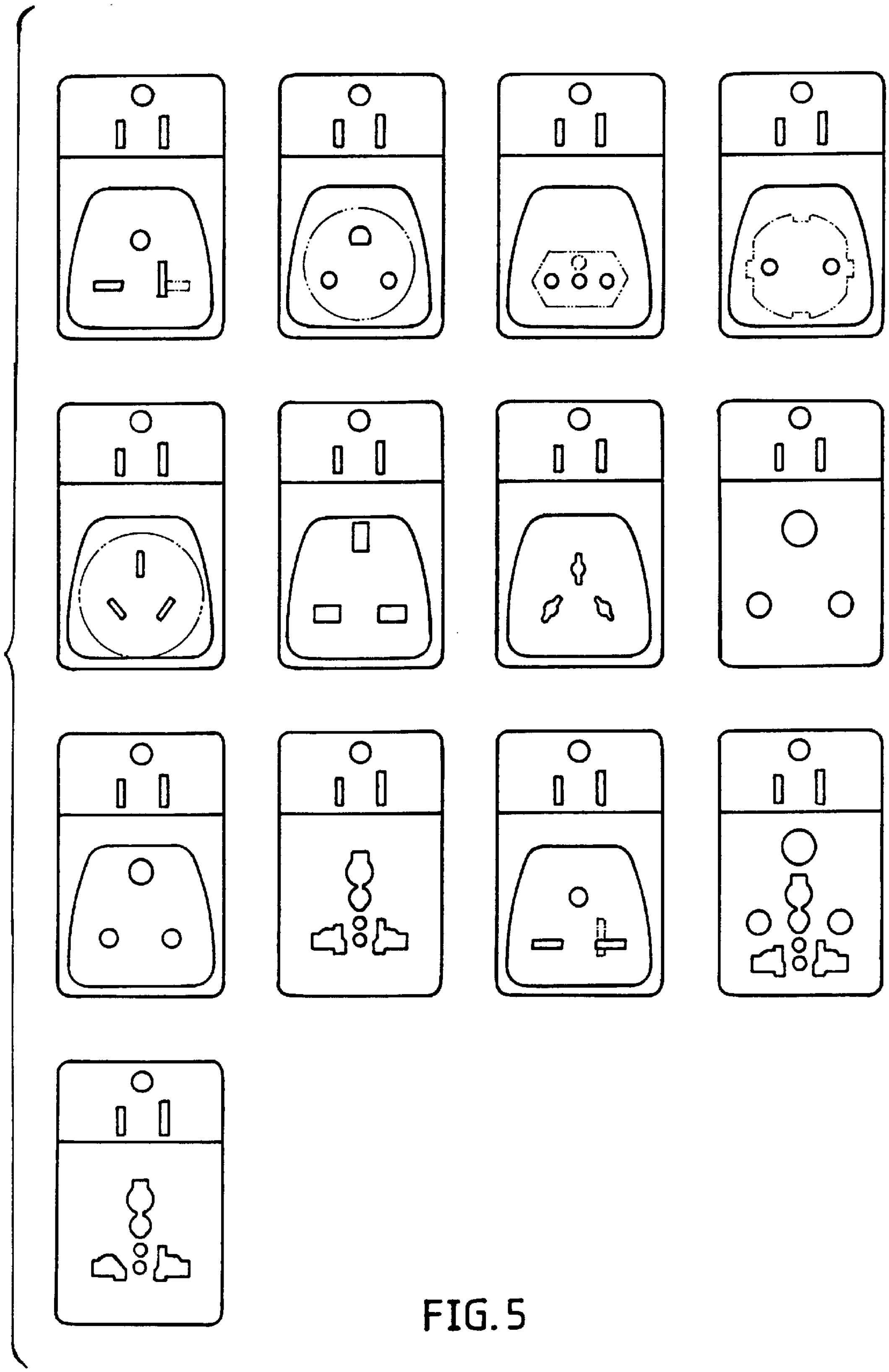
FIG. 5 illustrates different alternate forms of the face panel for the socket unit according to the present invention.
Figure 6:
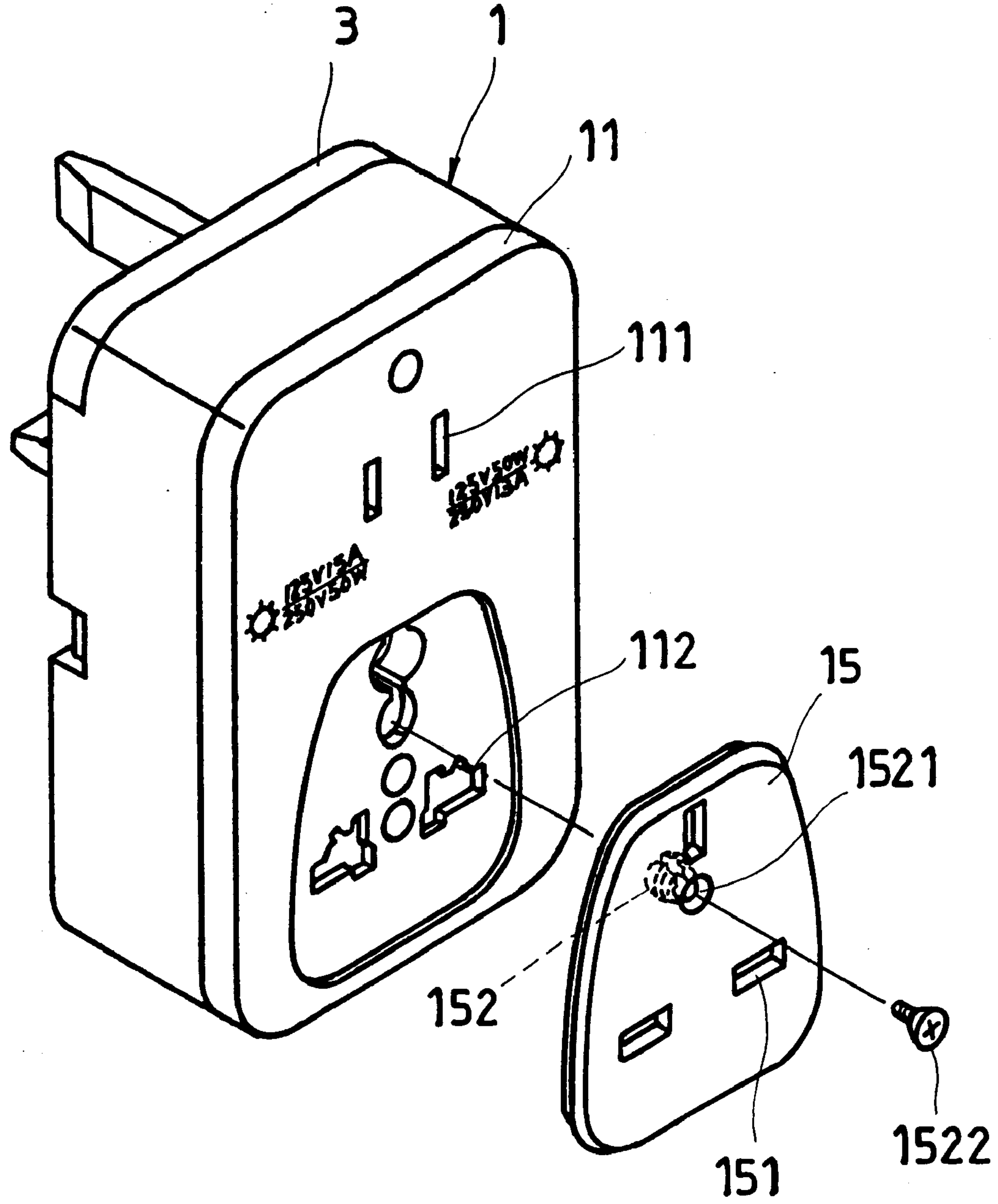
FIG. 6 is an exploded view of another alternate form of the multi-voltage multi-pole safety electric adapter according to the present invention.
Figure 7:
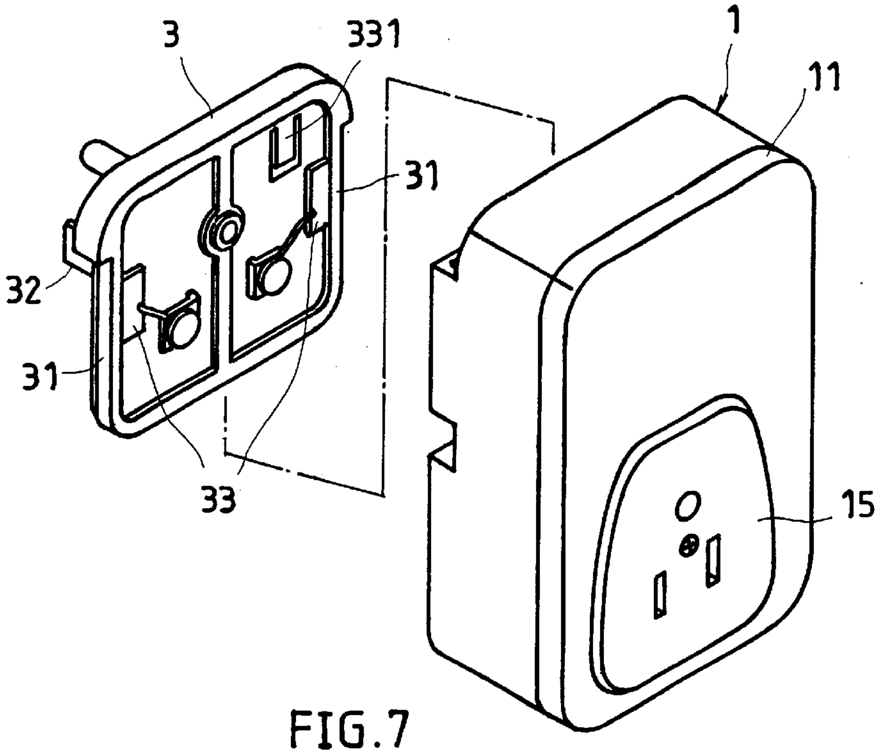
FIG. 7 is an exploded view of still another alternate form of the multi-voltage multi-pole safety electric adapter according to the present invention.
Figure 8:
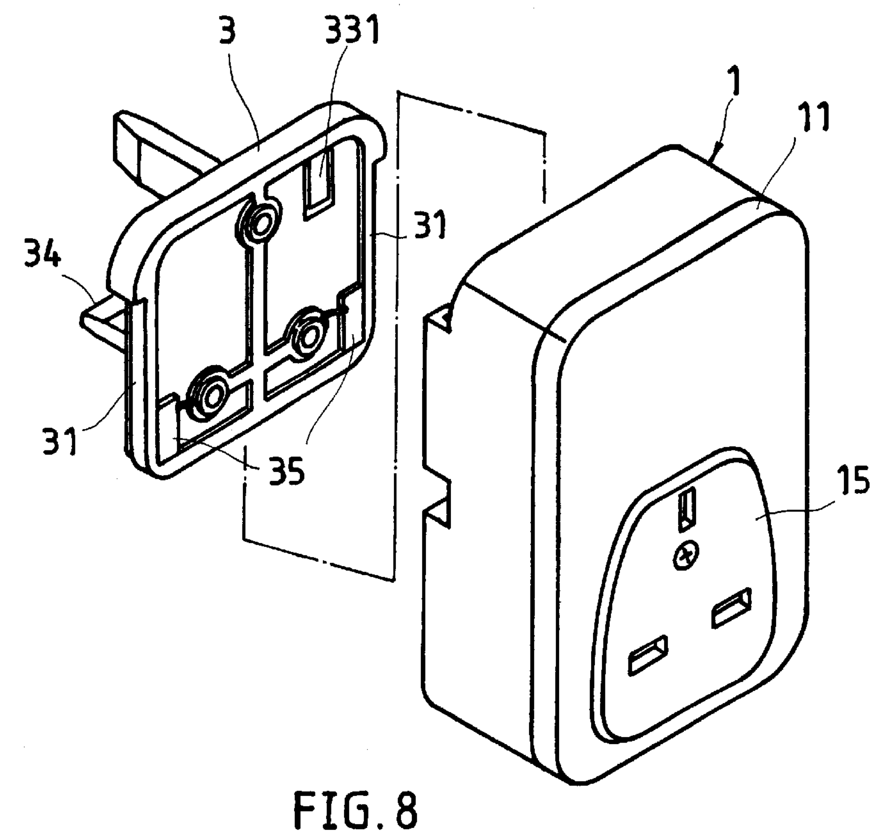
FIG. 8 is an exploded view of still another alternate form of the multi-voltage multi-pole safety electric adapter according to the present invention.

The plug unit 3 can be made to have any of a variety of configurations. FIG. 2-1 shows various alternate forms of the plug unit 3. The face panel 11 of the socket unit 1 can also be made to have any of a variety of configurations. FIG. 5 shows various alternate forms of the face panel for the socket unit 1.

Figure 4:
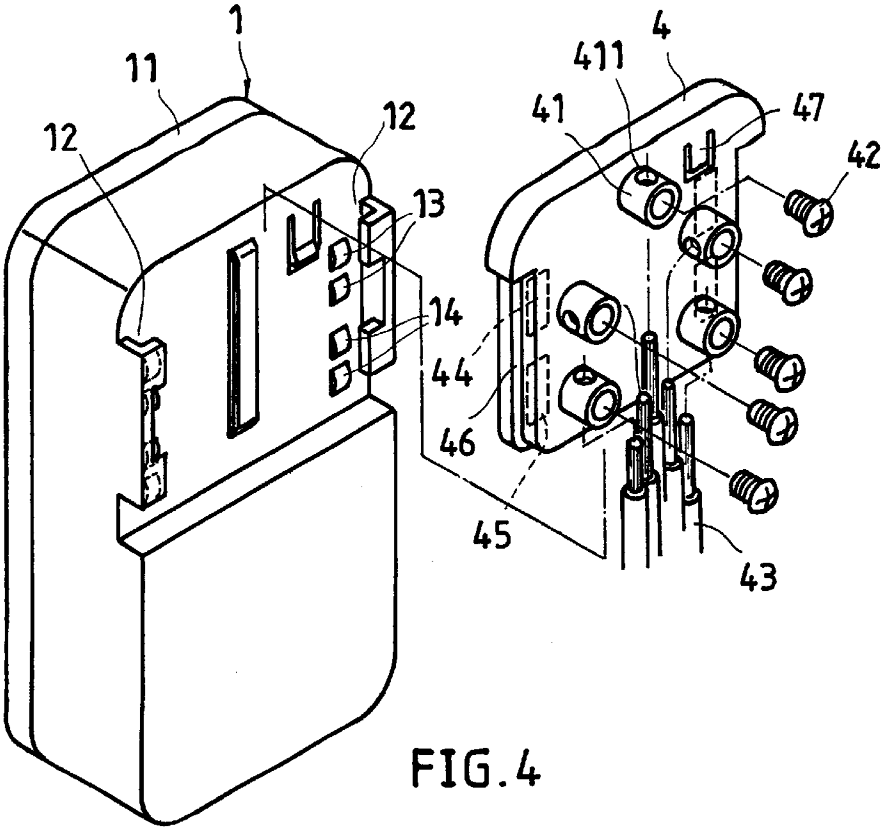
FIG. 4 is an exploded view of an alternate form of the multi-voltage multi-pole safety electric adapter according to the present invention.

FIG. 4 shows an alternate form of the multi-voltage multi-pole safety electric adapter. According to this alternate form, the multi-voltage multi-pole safety electric adapter comprises a socket unit 1, a transformer 2 installed in the socket unit 1, and a wire distribution plate 4 fastened to the socket unit 1. The socket unit 1 of this alternate form is identical to that shown in FIGS. from 1 through 3. The wire distribution plate 4 comprises two sliding rails 46 respectively formed integral with two opposite lateral sides walls thereof for insertion into the sliding tracks 12 at the socket unit 1, a springy retaining strip 47 for engagement with the springy hook 121 to secure the wire distribution plate 4 to the socket unit 1, a plurality of metal contacts 44 and 45, which are respectively forced into contact with the metal contacts 13 and 14 at the socket unit 1 after insertion of the sliding rails 46 into the sliding tracks 12 at the socket unit 1, a plurality of tubular wire holders 41 each having a wire hole 411, a plurality of electric wires 43 respectively inserted into the wire hole 411 on each tubular wire holder 41, and a plurality of tie screws 42 respectively threaded into the tubular wire holders 41 to fix the electric wires 43 to the tubular wire holders 41 and to keep the conductors of the electric wires 43 in contact with the metal contacts 44 and 45 respectively.

Referring to FIG. 1 again, two different color indicator lights 131 and 141 are provided at the socket unit 1 to indicate the connection of low voltage operation mode or high voltage operation mode.

FIGS. from 6 through 8 show another alternate form of the present invention. According to this alternate form, a subsidiary cover panel 15 is press-fitted into a recessed area on the face panel 11 and covered over the second set of plugholes 112. The subsidiary cover panel 15 comprises one set of plug holes 151 for the insertion of a particular electric pluge a split bolt 152 perpendicularly raised from the back side wall thereof and engaged into one vacant plug hole 112 on the face panel 11, and a through hole 1521 axially extended through the split bolt 152 into which a screw 1522 is threaded to expand the split bolt 152 and to force the split bolt 152 in tight engagement with the corresponding plug hole 112. The lugholes 151 of the subsidiary cover panel 15 can be made to fit a low voltage AC125V plug or high voltage AC250V plug.

Figure 9:
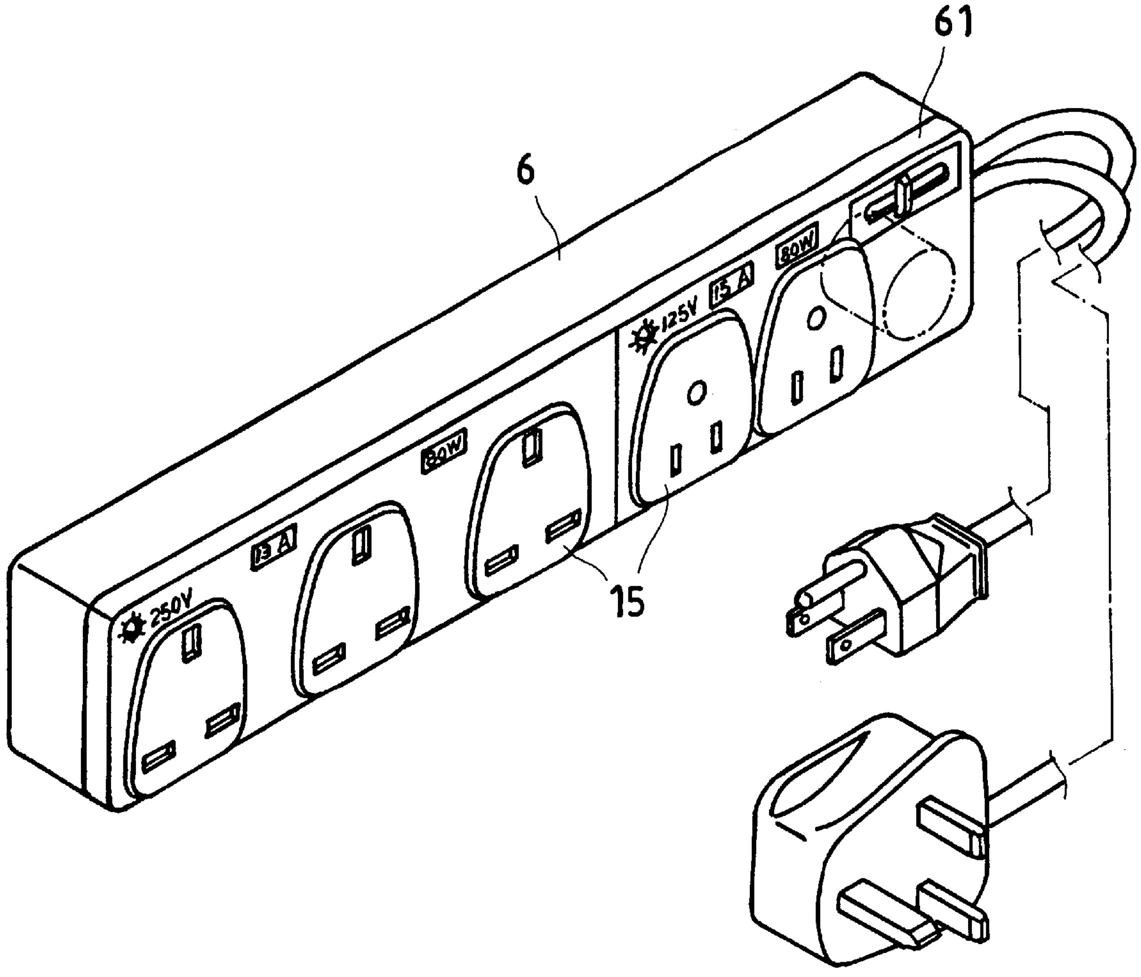
FIG. 9 shows an extension cable constructed according to the present invention.
Figures 1, 10:
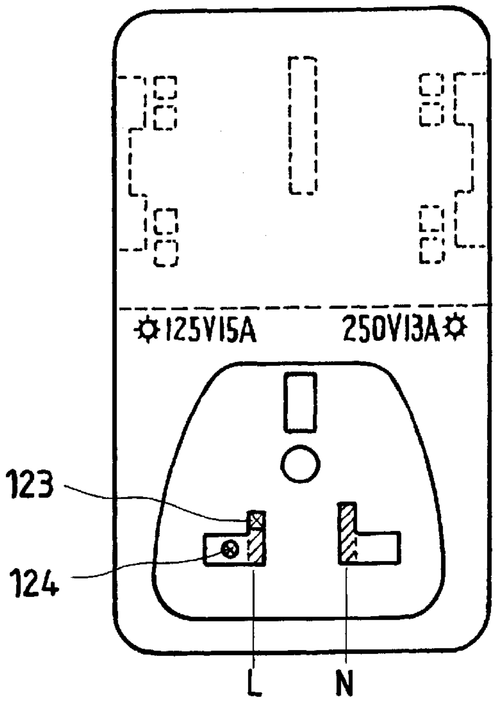
Figures 2, 10:
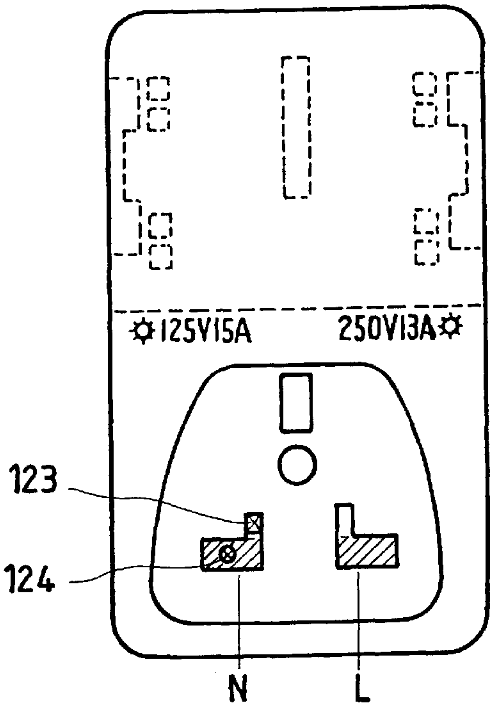
Figure 11:
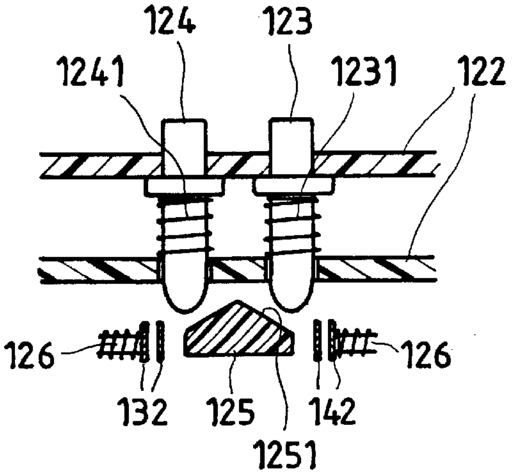
FIG. 11 illustrates the arrangement of the safety switch means for the socket unit according to the present invention.
Figure 12:
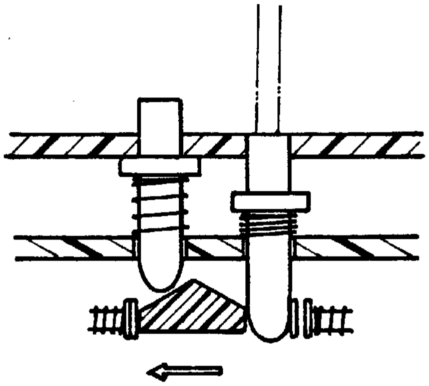
FIG. 12 is similar to FIG. 11 but showing one metal push rod depressed, the sliding block moved leftwards.
Figure 13:
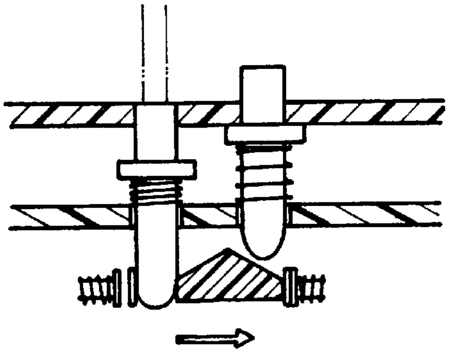
FIG. 13 is similar to FIG. 11 but showing one metal push rod depressed, the sliding block moved rightwards.
Figure 14:
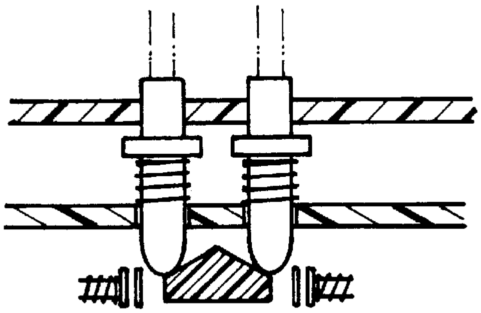
FIG. 14 is similar to FIG. 11 but showing the metal push rods depressed, the sliding block immovable.
Figure 15:
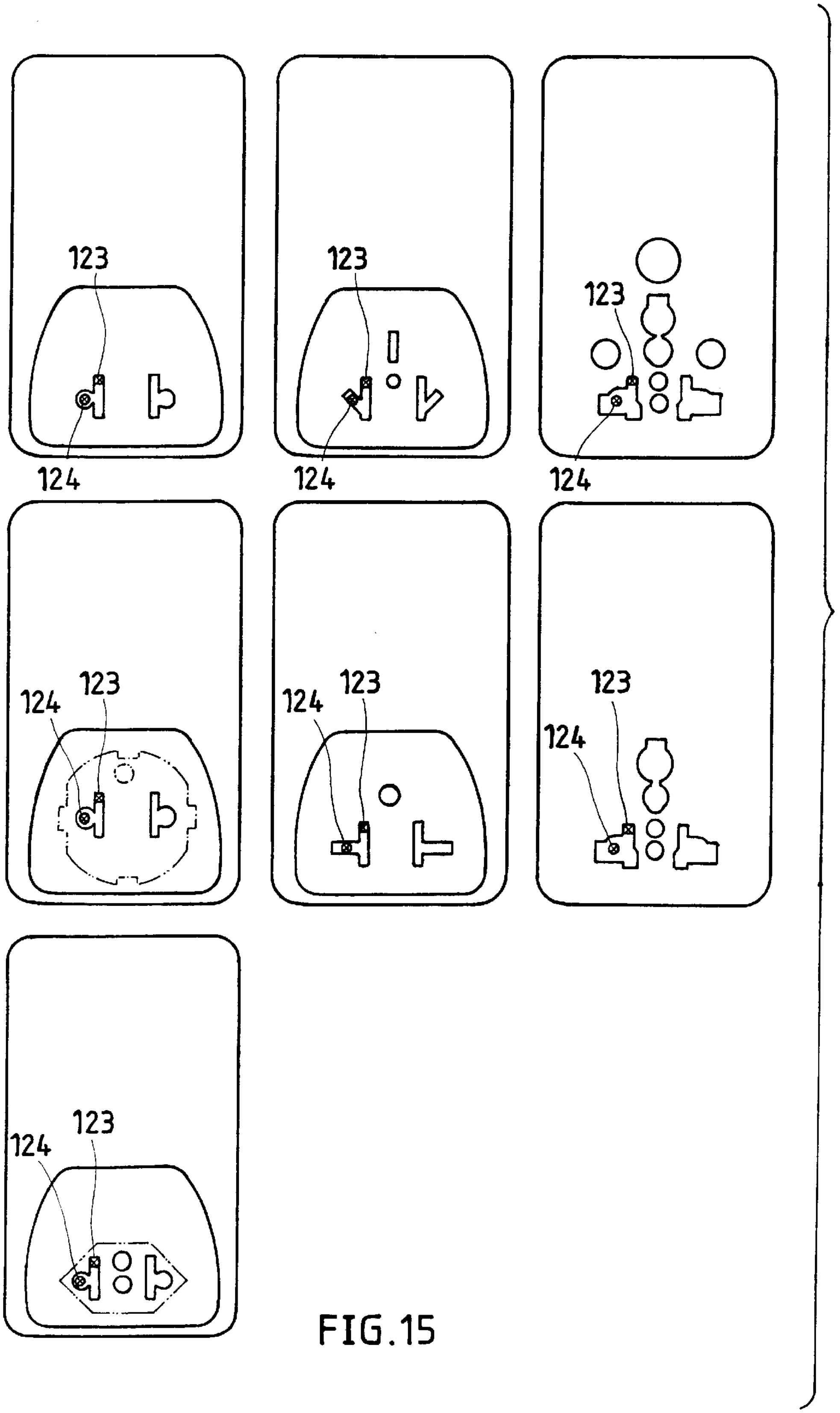
FIG. 15 shows different alternate forms of the socket unit with the safety switch means installed therein according to the present invention.

Referring to FIG. 9, the design of the face panel 11 with the subsidiary cover panel 15 may be used in the face panel 61 of an extension cable 6.

Referring to FIGS. 10, 10-1, 10-2, 11, 12, 13, 14 and 15, safety switch means is provided in the socket unit 1, and controlled to switch on/off the low voltage (AC125V) circuit and/or the high voltage (AC250V) circuit. The safety switch means comprises two parallel partition walls 122 disposed inside the socket unit 1, two metal push rods 123 and 124 respectively and axially movably mounted in a respective through hole (not shown) on each partition wall 122 corresponding to one plug hole on the face panel 11 of the socket unit 1, two springs 1231 and 1241 respectively mounted on the metal push rods 123 and 124 and supported on one partition wall 122 to hold the metal push rods 123 and 124 in position, a double-beveled sliding block 125 transversely slidably mounted inside the socket unit 1 behind the partition walls 12 between the metal push rods 123 and 124, two stop blocks 126 fixedly disposed inside the socket unit 1 and spaced from the double-beveled sliding block 125 at two opposite lateral sides, a low voltage metal contact plate 132 and a high voltage metal contact plate 142 respectively suspended between the double-beveled sliding block 125 and the stop blocks 126 (see FIG. 11). When a low voltage (AC125V) plug is inserted into the plugholes on the face panel 11 of the socket unit 1 (see the hatched area in FIG. 10-1) the corresponding metal push rod 123 is forced down to move the double-beveled sliding block 125 leftwards, thereby causing the low voltage metal contact plate 132 to be moved to the "on" position (see FIG. 12). When a high voltage (AC250V) plug is inserted into the plug holes on the face panel 11 of the socket unit 1 (see the hatched area in FIG. 10-2) the corresponding metal push rod 124 is forced down to move the double-beveled sliding block 125 rightwards, thereby causing the high voltage metal contact plate 142 to be moved to the "on" position (see FIG. 13). After removable of the installed low voltage (AC125V) plug or high voltage (AC250V) plug from the socket unit 1, the metal push rod 123 or 124 is pushed back to its former position, i.e., the metal push rods 123 and 124 are moved away from the double-beveled sliding block 125, at the time the double-beveled sliding block 125 is held by, for example, spring means (not shown) in the middle position equally spaced between the metal contact plates 132 and 142, and the low voltage circuit as well as the high voltage circuit of the socket unit 1 are off (see FIG. 11). In case the metal push rods 123 and 124 are simultaneously pushed down, the double-beveled sliding block 125 is retained between the metal push rods 123 and 124 and kept away from the metal contact plates 132 and 142, and therefore the low voltage circuit as well as the high voltage circuit of the socket unit 1 are still maintained off (see FIG. 14). The metal push rod 124, which controls the high voltage metal contact plate 142, is disposed in the plughole on the socket unit corresponding to N pole of high voltage AC250V power circuit. In case a child inserts a metal rod member into the plug hole in which the metal push rod 124 is positioned, the presence of a high voltage at L pole plug hole does not cause the child to have the attach of an electric shock.

Figure 17:
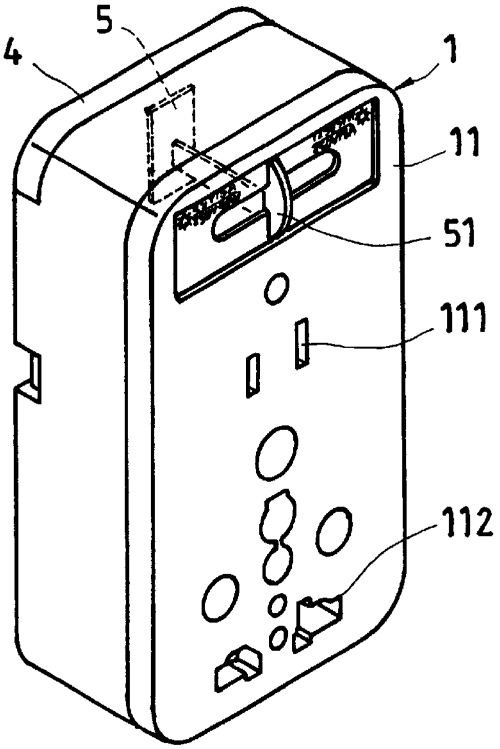
FIG. 17 is a perspective view of still another alternate form of the present invention, showing a selector switch installed in the socket unit.
Figure 16:
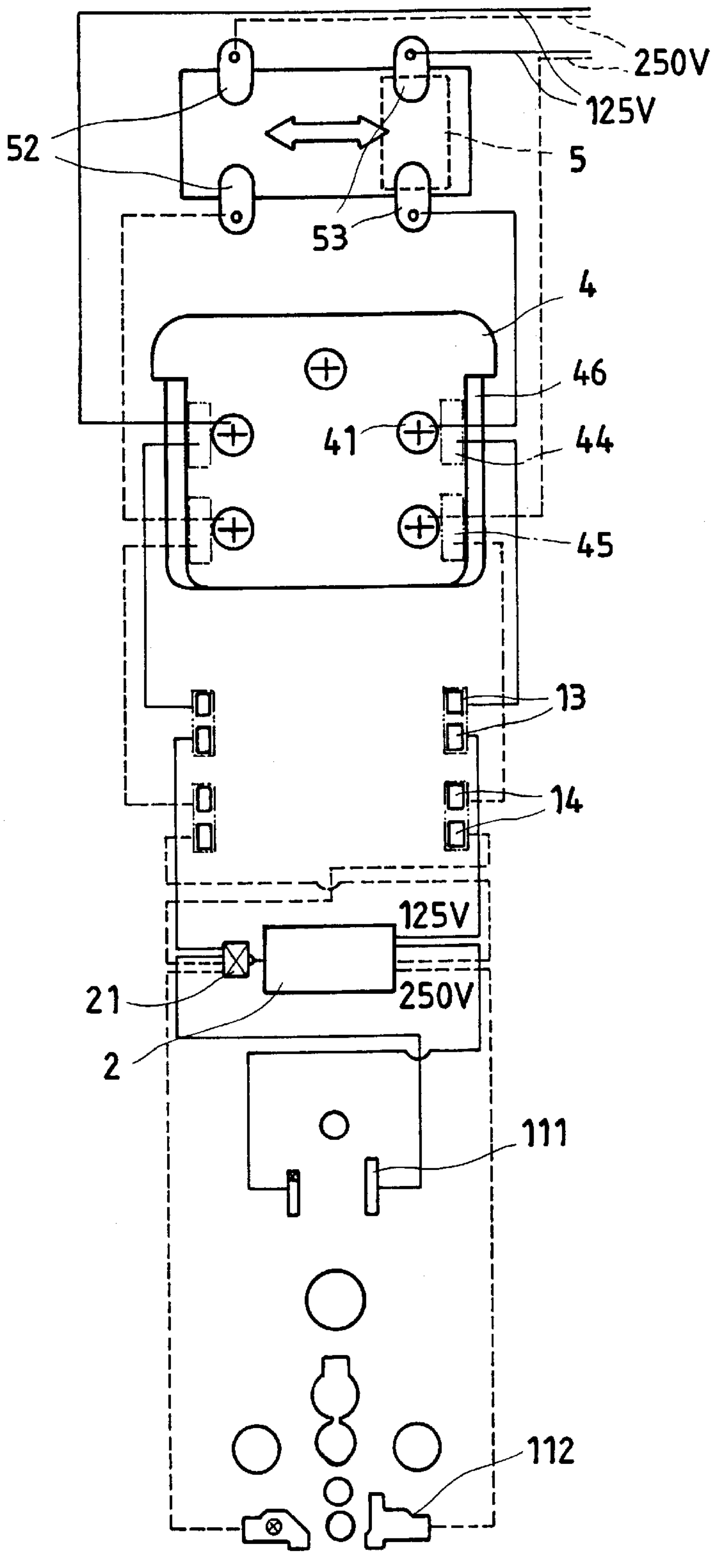
FIG. 16 is a circuit layout showing a selector switch installed in the socket unit according to the present invention.

Referring to FIGS. 16 and 17, a selector switch 5 is installed in the face panel 11 of the socket unit 1, and controlled to switch the socket unit 1 to between a first position where the socket unit 1 receives low voltage input, and a second position where the socket unit 1 receives high voltage input. The selector switch 5 comprises a first set of metal contacts 52 respectively connected to the first set of (low voltage) metal contacts 13, a second set of metal contacts 53 respectively connected to the second set (high voltage) metal contacts 14, and a control knob 51 moved to electrically connect the metal contacts 52 or 53.

It is to be understood that the drawings are designed for purposes of illustration only, and are not intended for use as a definition of the limits and scope of the invention disclosed.

What the invention claimed is:

1. A multi-voltage multi-pole safety electric adapter comprising:

a socket unit, said socket unit comprising a face panel, said face panel comprising a first set of plug holes for receiving a low voltage plug and a second set of plug holes for receiving a high voltage plug, a low voltage metal bracket and a high voltage metal bracket respectively mounted on the inside corresponding to said first set of plug holes and said second set of plug holes, a first set of metal contacts and a second set of metal contacts respectively disposed at a back side wall thereof and connected to said low voltage metal bracket and said high voltage metal bracket for low voltage power input and high voltage power input respectively;

a low voltage plug unit and a high voltage plug unit alternatively fastened to the back side wall of said socket unit for receiving a low voltage power supply from or high voltage power supply from an electric outlet, said low voltage plug unit comprising a set of metal contacts corresponding to the first set of metal contacts at said socket unit, said high voltage plug unit comprising a set of metal contacts corresponding to the second set of metal contacts at said socket unit;

a transformer installed in said socket unit and connected between the first set of metal contacts and second set of metal contacts of said socket unit and the low voltage metal bracket and high voltage metal bracket of said socket unit for converting low voltage input power supply or high voltage input power supply into the desired power level; and a circuit breaker connected between said transformer and said low voltage metal bracket and high voltage metal bracket.

2. The multi-voltage multi-pole safety electric adapter of claim 1 wherein said socket unit comprises a pair of sliding tracks bilaterally longitudinally disposed at the back side wall thereof for receiving said plug unit, and a springy hook formed integral with the back side wall thereof; said low voltage plug unit and said high voltage plug unit each comprise two parallel sliding rails for insertion into the sliding tracks at said socket unit, and a springy retaining strip for engagement with the springy hook at said socket unit.

3. The multi-voltage multi-pole safety electric adapter or claim 1 further comprising wire distribution plate for fastening to said socket unit selectively, said wire distribution plate comprising a first set of metal contacts corresponding to the first set of metal contacts at said socket unit, and a second set of metal contacts corresponding to the second set of metal contacts at said socket unit.

4. The multi-voltage multi-pole safety electric adapter of claim 1 wherein said socket unit further comprises a first color indicator light and a second color indicator light respectively electrically connected to said first metal bracket and said second metal bracket.

5. The multi-voltage multi-pole safety electric adapter of claim 1 wherein the second set of plug holes of said socket unit are adapted to receive different electric plugs constructed subject to different specifications used in different countries.

6. The multi-voltage multi-pole safety electric adapter of claim 1 further comprising a selector switch installed in said face panel of said socket unit and controlled to switch said socket unit to between a first position where said socket unit receives low voltage input, and a second position where said socket unit receives high voltage input, said selector switch comprising a first set of metal contacts respectively connected to the first set of metal contacts of said socket unit, a second set of metal contacts respectively connected to the second set metal contacts of said socket unit, and a control knob moved to electrically alternatively connect the first metal contacts and second metal contacts of said selector switch.

7. A multi-voltage multi-pole safety electric adapter comprising:

a socket unit, said socket unit comprising a face panel, said face panel comprising a first set of plug holes for receiving a low voltage plug, a second set of plug holes for receiving a high voltage plug, a low voltage metal bracket and a high voltage metal bracket respectively mounted on the inside corresponding to said first set of plug holes and said second set of plug holes, a first set of metal contacts and a second set of metal contacts respectively disposed at a back side wall thereof and connected to said low voltage metal bracket and said high voltage metal bracket for low voltage power input and high voltage power input respectively, and a subsidiary cover panel covered on a recessed portion on said face panel over said second set of plug holes for enabling an assigned electric plug to be installed in the second set of plug holes on said face panel of said socket unit; and a plug unit fastened to the backside wall of said socket unit for receiving power supply from an electric outlet.

8. The multi-voltage multi-pole safety electric adapter of claim 7 wherein said subsidiary cover panel comprises a split bolt inserted into one plug hole on said face panel of said socket unit, and a screw threaded into said split bolt to expand said split bolt and to fix said split bolt to the corresponding plug hole on said face panel of said socket unit.

9. A multi-voltage multi-pole safety electric adapter of claim 8 further comprising a safety switch means installed in said socket unit and controlled to switch on/off the low voltage circuit between the first set of metal contacts and low voltage metal bracket of said socket unit and/or the high voltage circuit between the second set of metal contacts and high voltage metal bracket of said socket unit, said safety switch means comprising two parallel partition walls disposed inside said socket unit, a double-beveled sliding block transversely slidably mounted inside said socket unit, two stop blocks fixedly disposed inside said socket unit and spaced from said double-beveled sliding block at two opposite lateral sides, a low voltage metal contact plate and a which voltage metal contact plate respectively suspended between said double-beveled sliding block and said stop blocks, a first metal push rod and a second metal push rod respectively and axially movably mounted in a respective through hole on each partition wall corresponding to one plug hole on said face panel, and two springs respectively mounted on said metal push rods and supported on one partition wall to hold the metal push rods in position.

10. The multi-voltage multi-pole safety electric adapter of claim 7, which is formed integral with a part of an extension cable.

* * * * *